(12) United States Patent
Baccouche et al.

(10) Patent No.: US 8,276,955 B2
(45) Date of Patent: Oct. 2, 2012

(54) ZERO STACK-UP TELESCOPICALLY COLLAPSIBLE ENERGY ABSORBING RAIL AND BRACKET ASSEMBLY

(75) Inventors: Mohamed Ridha Baccouche, Ann Arbor, MI (US); Saied Nusier, Canton, MI (US); Saeed David Barbat, Novi, MI (US); Hikmat F. Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 12/732,566

(22) Filed: Mar. 26, 2010

(65) Prior Publication Data
US 2011/0233947 A1 Sep. 29, 2011

(51) Int. Cl.
*B60R 19/26* (2006.01)
(52) U.S. Cl. ........................................ 293/133
(58) Field of Classification Search ............... 293/132, 293/133; 296/187.03
See application file for complete search history.

(56) References Cited

U.S. PATENT DOCUMENTS

| | | | |
|---|---|---|---|
| 2,843,725 A * | 7/1958 | Granberg ................ 219/105 |
| 3,077,355 A | 2/1963 | Santesso |
| 3,146,014 A * | 8/1964 | Kroell ..................... 293/133 |
| 3,599,757 A | 8/1971 | Takamatsu et al. |
| 3,715,130 A | 2/1973 | Harada et al. |
| 3,998,485 A | 12/1976 | Putter et al. |
| 4,023,652 A | 5/1977 | Torke |
| 4,031,978 A * | 6/1977 | Taylor ..................... 180/232 |
| 4,152,012 A | 5/1979 | Reidelbach et al. |
| 4,272,114 A * | 6/1981 | Hirano et al. ............ 293/133 |
| 4,355,844 A | 10/1982 | Muzzarelli |
| 4,684,151 A | 8/1987 | Drewek |
| 4,929,008 A * | 5/1990 | Esfandiary ............... 293/108 |
| 4,976,481 A * | 12/1990 | Yoshihira ................. 293/133 |
| 5,273,330 A * | 12/1993 | Petry et al. .............. 293/132 |
| 5,419,416 A | 5/1995 | Miyashita et al. |
| 5,429,388 A | 7/1995 | Wheatley et al. |
| 5,549,327 A * | 8/1996 | Rusche et al. ........... 280/751 |
| 5,853,195 A | 12/1998 | Le et al. |
| 5,876,077 A * | 3/1999 | Miskech et al. ......... 293/132 |
| 6,003,934 A | 12/1999 | Usui |
| 6,007,099 A | 12/1999 | Barthelemy et al. |
| 6,106,039 A * | 8/2000 | Maki ....................... 293/132 |
| 6,174,009 B1 | 1/2001 | McKeon |
| 6,179,355 B1 | 1/2001 | Chou et al. |
| 6,293,587 B1 * | 9/2001 | Lapic et al. .............. 280/784 |
| 6,367,869 B1 | 4/2002 | Baccouche et al. |
| 6,409,239 B1 * | 6/2002 | Tjoelker et al. ......... 293/133 |
| 6,422,604 B2 * | 7/2002 | Lapic ...................... 280/784 |
| 6,474,709 B2 | 11/2002 | Artner |
| 6,554,333 B2 * | 4/2003 | Shimotsu et al. ........ 293/132 |
| 6,588,830 B1 | 7/2003 | Schmidt et al. |
| 6,695,393 B1 | 2/2004 | Aouadi et al. |
| 6,702,345 B1 * | 3/2004 | Yoshida .................. 293/133 |
| 6,820,924 B2 | 11/2004 | Caliskan et al. |
| 6,834,898 B2 | 12/2004 | Wang et al. |
| 6,905,136 B2 * | 6/2005 | Vidal et al. .............. 280/752 |

(Continued)

*Primary Examiner* — H Gutman
(74) *Attorney, Agent, or Firm* — Fredrick V. Owens; Brooks Kushman P.C.

(57) ABSTRACT

An energy absorbing assembly for a vehicle that has a bumper and a frame. A receptacle is defined within the frame. A collapsible member is provided between the bumper and a recessed location spaced away from the bumper in the receptacle. The collapsible member may collapse at least partially into the receptacle in the event of a collision.

11 Claims, 2 Drawing Sheets

U.S. PATENT DOCUMENTS

| | | | |
|---|---|---|---|
| 6,908,129 B2 * | 6/2005 | Shimotsu | 293/133 |
| 6,929,297 B2 | 8/2005 | Muller et al. | |
| 6,957,846 B2 | 10/2005 | Saeki | |
| 7,021,686 B2 * | 4/2006 | Glasgow et al. | 293/132 |
| 7,070,217 B2 | 7/2006 | Longo | |
| 7,182,191 B2 | 2/2007 | Scott et al. | |
| 7,185,945 B2 | 3/2007 | Dandekar et al. | |
| 7,188,890 B1 | 3/2007 | Baccouche et al. | |
| 7,201,413 B2 * | 4/2007 | Hillekes et al. | 293/133 |
| 7,255,378 B1 | 8/2007 | Baccouche et al. | |
| 7,341,299 B1 | 3/2008 | Baccouche et al. | |
| 7,357,432 B2 * | 4/2008 | Roll et al. | 293/133 |
| 7,357,445 B2 | 4/2008 | Gross et al. | |
| 7,416,043 B2 | 8/2008 | Pipkorn et al. | |
| 7,441,819 B2 | 10/2008 | Azzouz et al. | |
| 7,677,617 B2 * | 3/2010 | Stewart et al. | 293/133 |
| 7,905,366 B2 * | 3/2011 | Jaede | 213/7 |
| 7,926,868 B2 * | 4/2011 | Braunbeck et al. | 296/187.03 |
| 2005/0211520 A1 | 9/2005 | Abu-Odeh et al. | |
| 2006/0125251 A1 * | 6/2006 | Glasgow et al. | 293/132 |
| 2006/0237976 A1 | 10/2006 | Glasgow et al. | |
| 2007/0052258 A1 | 3/2007 | Baccouche et al. | |
| 2008/0007088 A1 | 1/2008 | Newport | |
| 2008/0054665 A1 | 3/2008 | Baccouche et al. | |
| 2008/0073926 A1 | 3/2008 | Azzouz et al. | |
| 2008/0106107 A1 | 5/2008 | Tan et al. | |
| 2009/0315365 A1 | 12/2009 | Baccouche et al. | |

* cited by examiner

ZERO STACK-UP TELESCOPICALLY COLLAPSIBLE ENERGY ABSORBING RAIL AND BRACKET ASSEMBLY

BACKGROUND

1. Technical Field

The present invention relates to a kinetic energy absorbing rail and attachment bracket assembly.

2. Background Art

Vehicles are designed to manage kinetic energy to protect vehicle occupants in the event of a collision. Frame members and frame rails are used to provide a protective cage around the passenger compartment. Telescopically collapsible rails are used to absorb kinetic energy in predetermined locations so that less energy is required to be absorbed in the mid-body portions of the vehicle.

Preferential crush zones are generally provided inboard of a front bumper and may also be provided inboard of a rear bumper. Normally, only a limited amount of space is available in a vehicle design to provide for crush zones. Conventional telescopically collapsible rails may collapse to between 20-30% of their over all length in a collision having sufficient force to require the rails to fully collapse. As a result, only 70-80% of the space in a preferential crush zone is available for absorbing kinetic energy in a collision.

To the extent that more energy can be managed in the preferential crush zones, less energy load is applied to the mid-body portions of the vehicle. Vehicle mass can be reduced and fuel efficiency can be improved to the extent that more energy is absorbed by the telescopically collapsible rails. The additional energy absorbed by the collapsible rails results in less energy being applied to the mid-body portions of the vehicle.

This application discloses and claims an apparatus that is directed to the above problems and limitations of the prior art.

SUMMARY

According to one aspect of this application, an energy absorbing assembly is provided for a vehicle that has a bumper and a frame. The assembly comprises a receptacle defined within the frame that extends through an outer end of the frame. A collapsible member is located between the bumper and a recessed location within the receptacle. The collapsible member may collapse at least partially into the receptacle in the event of a collision.

According to others aspects of this application, the collapsible member may collapse completely into the receptacle in the event of a collision. A bracket of the frame may define the receptacle and kinetic energy may be absorbed by the collapsible member until the collapsible member is completely received in the receptacle.

The receptacle may be part of a bracket that defines by a hollow cylindrical portion that has an inner diameter dimension. The telescopically collapsing member may have a maximum diameter section that is cylindrical and has an outer diameter that is less than the inner diameter of the hollow cylindrical part of the bracket. A longitudinally outer portion of the maximum diameter section of the telescopically collapsing member may be attached to the outer end of the frame and a longitudinally inboard portion of the maximum diameter section may be attached to an inboard side of the hollow cylindrical part of the bracket.

An extended portion of the telescopically collapsing member may be disposed forward of the maximum diameter section may include a plurality of sections that are of decreasing diameter progressively from the maximum diameter section to the bumper. Each of the plurality of sections is intended to collapse into the next greater diameter section.

According to another aspect of this application, a frame for a vehicle is provided with an energy absorbing telescopically collapsing member. The frame comprises a bracket disposed at an outer end of the frame that defines an opening that extends from the outer end of the frame to a location spaced inboard of the outer end of the frame. The telescopically collapsing member is received within the opening with a first end that is proximate a bumper of the vehicle and a second end that is disposed at least partially inboard of the outer end of the frame.

According to further aspects of the frame for the vehicle, the opening in the bracket provides clearance for the telescopically collapsing member to collapse fully or partially behind the outer end of the frame and into the opening. The opening in the bracket may be defined by a hollow cylindrical part of the bracket that has an inner diameter dimension. The telescopically collapsing member may also be cylindrical and the maximum diameter section may have an outer diameter that is less than the inner diameter of the hollow cylindrical part of the bracket.

The second end of the telescopically collapsing member may be welded to the location spaced inboard of the outer end of the frame. The telescopically collapsing member may also be welded to the bracket at the outer end of the frame. The location where the second end is welded to the frame may be disposed at the opposite end of the opening in the bracket from the outer end of the frame. The bracket may be one that extends in a vertical direction and is secured to a lower frame member and to an upper frame rail.

These and other aspects of this application will be better understood and more fully described with reference to the attached drawings below.

DETAILED DESCRIPTION

Figure 1:
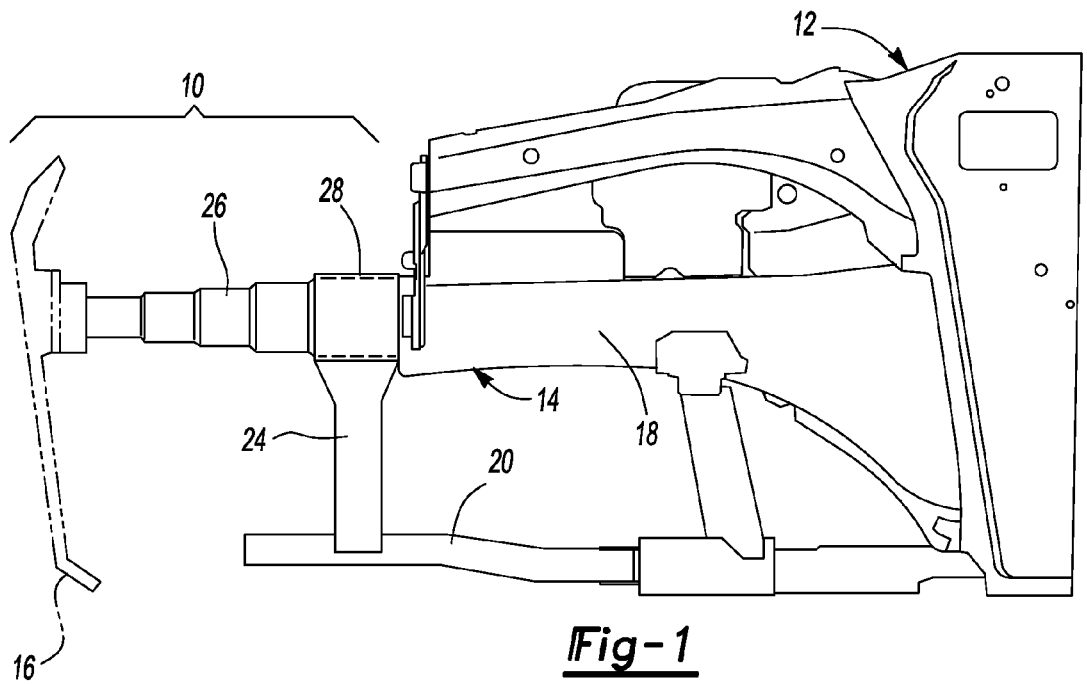
FIG. 1 is a side elevation view of the front frame of a vehicle that is provided with a bracket and telescopically collapsible member.

Referring to FIG. 1, an energy absorbing assembly generally identified by reference numeral 10 is shown in conjunction with a vehicle generally indicated by reference numeral 12. A portion of the vehicle illustrated in FIG. 1 is a front frame assembly generally indicated by reference numeral 14. A front bumper 16 is provided, but it should be understood that the invention is equally applicable to rear bumpers. The front frame assembly 14 includes an upper frame rail 18 and a sub-frame 20. A bracket 24 is connected to and extends between the upper frame rail 18 and the sub-frame 20.

A telescopically collapsing member 26 is disposed between the bumper 16 and the upper frame rail 18 and forms part of the front frame assembly 14. The bracket 24 includes a receptacle 28 that comprises a cylindrical tubular end of the bracket 24. The telescopically collapsing member is received within the receptacle 28.

Figure 2:
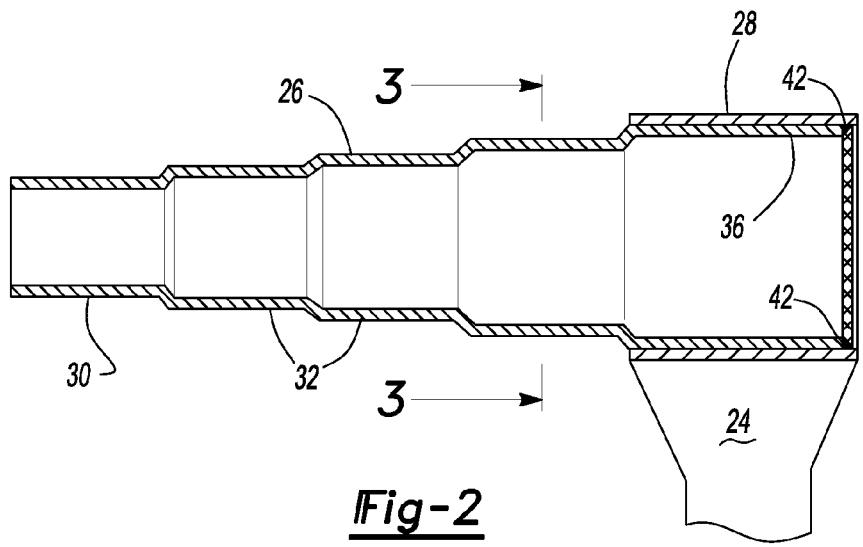
FIG. 2 is a fragmentary longitudinal cross-section view of the bracket and telescopically collapsible member illustrated in FIG. 1.

Referring to FIG. 2, the bracket 24 is shown with the telescopically collapsing member 26 being received within the receptacle 28. The telescopically collapsing member 26 includes a lead section 30 that has a minimum diameter and a plurality of intermediate sections 32 that are of increasing diameter compared to the lead section 30 and the next adjacent section. A receiving section 36 is the section of the collapsing member 26 that has the maximum diameter. The receiving section 36 is assembled within the receptacle 28 of the bracket 24.

Figure 3:
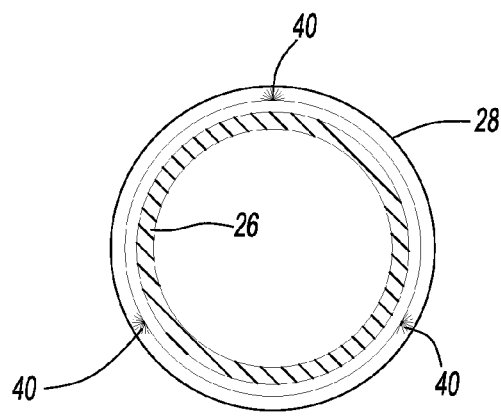
FIG. 3 is a lateral cross-section view taken along the line 3-3 in FIG. 2.

Referring to FIG. 3, the telescopically collapsing member 26 is shown in a cross-section taken through the telescopically collapsing member 26 toward the receptacle 28. The telescopically collapsing member 26 and the receptacle 28 shown in FIG. 3 are cylindrical in shape. It is possible to practice the invention using other shapes, such as those shown and described with reference to FIGS. 6-8. Three outer end welds 40 are shown that secure the collapsing member 26 to the receptacle 28 at spaced locations at the front end of the front frame assembly 14. The welds 40 could be MIG welds, resistance welds, laser welds, or the like.

Referring to FIG. 2, inboard welds 42 are provided to join the receptacle 28 to the maximum diameter section or receiving section 36 of the collapsing member 26 on the opposite side of the receptacle 28 from the outer end welds 40. The receiving section 36 is at least tack welded and potentially more fully welded to both ends of the receptacle 28.

Figure 4:
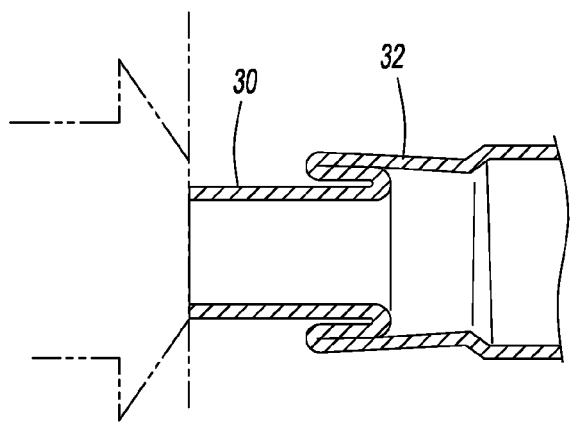
FIG. 4 is a diagrammatic fragmentary cross-sectional view showing the telescopically collapsible member beginning to collapse.

Referring to FIG. 4, the collapsible member 26 is shown at a point in a collision where an impact indicated by the phantom arrow at the left side of FIG. 4 is applying a load to the end of the lead section 30. The lead section 30 is shown collapsing into the next adjacent intermediate section 32. The collapsing tube forms two reversely turned parts of the collapsing member 26. This process of collapsing sequentially into the other intermediate section may continue if the load continues to be applied to the lead section 30. If only a minor impact is imparted, the extent to which the tube collapses may be at the point shown at FIG. 4 or later depending upon the amount of load applied.

Figure 5:
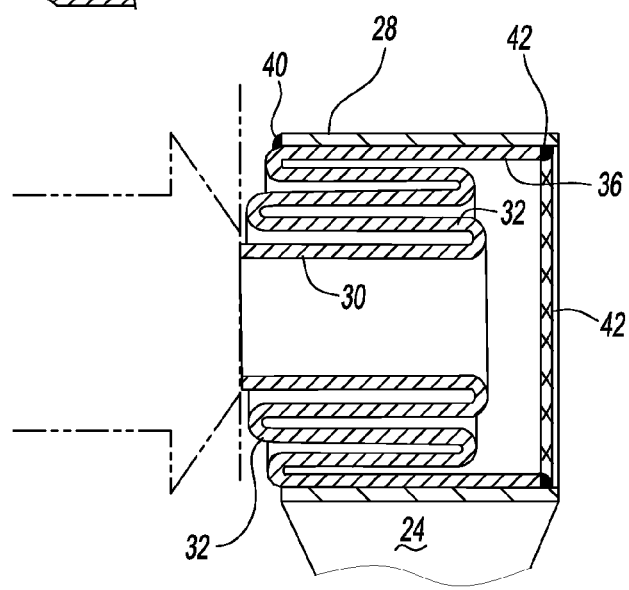
FIG. 5 is a diagrammatic fragmentary cross-sectional view showing the telescopically collapsible member nearly fully collapsed into the opening defined by the bracket.

Referring to FIG. 5, the telescopically collapsing member 26 is shown nearly fully collapsed into the receptacle 28. The receptacle is shown with the receiving section 36 in the same position as shown in FIG. 2. However, it should be understood that depending upon the dynamics and kinetic energy applied some distortion of the receiving section 36 and receptacle may occur. However, as shown in FIG. 5, the lead section 30 is collapsed to a point just outside of the receptacle 28 and the intermediate sections 32 are collapsed upon themselves. The collapsing of the telescopically collapsing member 26 may continue until the collapsing member 26 is fully received in the receptacle 28. At this point, the telescopically collapsing member 26 is collapsed to provide a zero stack up relative to the outer end of the frame. The outer end of the frame is defined as being the end of the receptacle 28 closest to the bumper 16.

Figure 6:
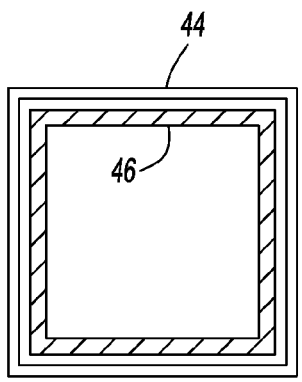
FIG. 6 is a lateral cross-section view of a square or rectilinear embodiment of the receptacle in the telescopically collapsible tube made according to an alternative embodiment of the disclosure.

Referring to FIG. 6, an alternative embodiment is shown in which a square receptacle 44 receives a square collapsing member 46. This embodiment is the least efficient embodiment in terms of kinetic energy absorbed per cross sectional area of telescopically collapsing tube. The most efficient embodiment is illustrated in FIGS. 1-5.

Figure 7:
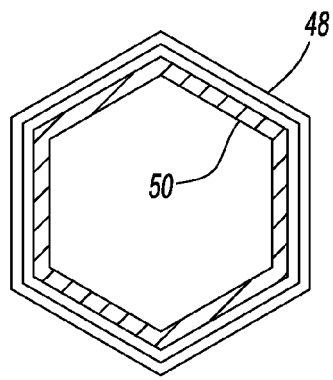
FIG. 7 is a lateral cross-section view of a hexagonal embodiment of the receptacle in the telescopically collapsible tube made according to an alternative embodiment of the disclosure.

Referring to FIG. 7, a hexagonal receptacle 48 is shown with a hexagonal collapsing member 50. This embodiment is more efficient than an embodiment of FIG. 6 in terms of kinetic energy absorbed upon complete collapse into the receptacle 48 per cross-sectional area of the collapsing member 50.

Figure 8:
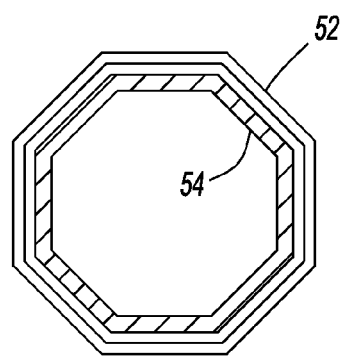
FIG. 8 is a cross-section view of an octagonal embodiment of the receptacle in the telescopically collapsible tube made according to an alternative embodiment of the disclosure.

Referring to FIG. 8, an octagonal receptacle 52 is shown with an octagonal collapsing member 54. This embodiment approaches the efficiency of the embodiment of FIGS. 1-5 in terms of kinetic energy absorbed per cross sectional area of collapsing member 54.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An energy absorbing assembly for a vehicle, the vehicle having a bumper and a frame, the assembly comprising:
    a bracket defining a receptacle within the frame that is a cylindrical tubular end of the bracket, wherein the receptacle has a first side that is closest to the bumper, and a second side that is furthest from the bumper;
    wherein the bracket is part of the frame extending between an upper frame rail and a subframe; and
    a collapsible member partially received within the receptacle and extending between the bumper and the second side of the receptacle, wherein the collapsible member may collapse fully into the receptacle in the event of a collision to provide zero stack-up relative to the first side of the receptacle.

2. The assembly of claim 1 wherein the collapsible member may collapse completely into the receptacle in the event of a collision.

3. The assembly of claim 1 wherein kinetic energy may be absorbed by the collapsible member until the collapsible member is completely received in the receptacle.

4. The assembly of claim 1 wherein the receptacle is defined by a hollow cylindrical part of the bracket that has an inner diameter dimension and the collapsible member has a maximum diameter section that is cylindrical and has an outer diameter that is less than the inner diameter of the hollow cylindrical part of the bracket.

5. The assembly of claim 4 wherein a longitudinally outer portion of the maximum diameter section of the collapsible member is attached to the first side of the frame and a longitudinally inboard portion of the maximum diameter section is attached to the second side of the hollow cylindrical part of the bracket.

6. The assembly of claim 5 wherein an extended portion of the collapsible member is disposed forward of the maximum diameter section includes a plurality of sections that are of decreasing diameter progressively from the maximum diameter section to the bumper and wherein each of the plurality of sections collapses into the next greater diameter section.

7. A frame for a vehicle that is provided with an energy absorbing telescopically collapsing member, the frame comprising:
- a bracket disposed at an outer end of the frame, the bracket defining an opening that extends from the outer end of the frame to a location spaced inboard of the outer end of the frame;
- wherein the bracket is part of the frame extending between an upper frame rail and a subframe; and
- wherein the telescopically collapsing member has a first end that is proximate a bumper of the vehicle and a second end that is disposed at least partially inboard of the outer end of the frame and within the opening, and wherein the opening in the bracket provides clearance for the telescopically collapsing member to collapse fully behind the outer end of the frame and into the opening.

8. The frame of claim 7 wherein the opening in the bracket is defined by a hollow cylindrical part of the bracket that has an inner diameter dimension and the telescopically collapsing member is cylindrical, and wherein the maximum diameter section has an outer diameter that is less than the inner diameter of the hollow cylindrical part of the bracket.

9. The frame of claim 7 wherein the second end of the telescopically collapsing member is welded to the location spaced inboard of the outer end of the frame, and the telescopically collapsing member is also welded to the bracket at the outer end of the frame.

10. The frame of claim 9 wherein the location where the second end is welded to the frame is disposed at the opposite end of the opening in the bracket from the outer end of the frame.

11. The frame of claim 7 wherein the bracket extends in a vertical direction and is secured to a lower frame member and to an upper frame rail.

* * * * *